(12) United States Patent
Conroy

(10) Patent No.: US 6,898,897 B2
(45) Date of Patent: May 31, 2005

(54) INSECTICIDE PRESENTATION DEVICE

(76) Inventor: James J. Conroy, 18 Millbrook Ct., Great Neck, NY (US) 11021

( * ) Notice: Subject to any disclaimer, the term of this patent is extended or adjusted under 35 U.S.C. 154(b) by 0 days.

(21) Appl. No.: 10/034,041

(22) Filed: Dec. 20, 2001

(65) Prior Publication Data

US 2003/0115791 A1 Jun. 26, 2003

(51) Int. Cl.⁷ ................................................ A01M 1/20
(52) U.S. Cl. ......................................................... 43/131
(58) Field of Search .......................... 43/131, 121, 107; 241/95, 273.1, 273.2, 273.3, 273.4

(56) References Cited

U.S. PATENT DOCUMENTS

| | | | | |
|---|---|---|---|---|
| 478,691 A | * | 7/1892 | De Shon | 43/131 |
| 600,530 A | | 3/1898 | Harig | 43/121 |
| 790,620 A | | 5/1905 | Crofford | 43/121 |
| 1,091,441 A | * | 3/1914 | Robertson | 43/131 |
| 1,110,377 A | * | 9/1914 | Cowles | 43/131 |
| 1,156,584 A | * | 10/1915 | Bloom | 43/131 |
| 1,174,695 A | * | 3/1916 | Dawson | 43/131 |
| 1,286,763 A | * | 12/1918 | Pfeiffer, Sr. | 43/131 |
| 1,448,236 A | * | 3/1923 | Riney | 43/131 |
| 1,471,954 A | * | 10/1923 | Greenway | 43/131 |
| 1,566,199 A | | 5/1925 | Gaskins, Jr. | 43/131 |
| 1,729,389 A | * | 9/1929 | Hughett | 43/131 |
| 1,744,022 A | * | 1/1930 | Davis | 43/131 |
| 1,748,449 A | * | 2/1930 | Hughett | 43/131 |
| 1,870,628 A | * | 8/1932 | Hurley | 43/131 |
| 1,922,702 A | * | 8/1933 | Kristman | 43/131 |
| 2,207,286 A | * | 7/1940 | Cohen | 269/6 |
| 2,435,317 A | | 2/1948 | McGrew | 43/121 |
| 2,547,314 A | | 4/1951 | Grant | 43/131 |
| 2,665,518 A | | 1/1954 | Weil | 43/121 |
| 3,661,326 A | * | 5/1972 | Wilson | 43/120 |
| 3,704,539 A | * | 12/1972 | Alvarez | 43/131 |
| 4,173,093 A | | 11/1979 | Nakai | 43/121 |
| 4,807,391 A | * | 2/1989 | Bokiau | 43/131 |
| 5,390,441 A | * | 2/1995 | Pence | 43/131 |
| 5,531,043 A | | 7/1996 | Shiboh | 43/131 |
| 5,802,761 A | | 9/1998 | Demarest et al. | 43/131 |
| 5,873,193 A | * | 2/1999 | Jensen | 43/131 |
| 5,987,809 A | | 11/1999 | Cheok | 43/107 |
| 5,987,810 A | | 11/1999 | Nash | 43/107 |
| 6,014,834 A | * | 1/2000 | Ferland | 43/131 |
| 6,202,341 B1 | * | 3/2001 | Bernard | 43/131 |
| 6,618,983 B1 | * | 9/2003 | Spragins | 43/131 |
| 6,718,689 B1 | * | 4/2004 | Kolibas | 43/131 |
| 2003/0089025 A1 | * | 5/2003 | Maffo et al. | 43/131 |

FOREIGN PATENT DOCUMENTS

FR 2617012 A1 * 12/1988

* cited by examiner

*Primary Examiner*—Darren W. Ark
(74) *Attorney, Agent, or Firm*—Collard & Roe, P.C.

(57) ABSTRACT

A device for dispensing insecticide. The device includes a body, at least one crevasse and a plurality of protrusions extending out from the body. The body can have a circular, triangular, square or any other polygonal shape. The body can also be formed as an elongate member wherein the at least one crevasse extends along a longitudinal axis of this body. The body can also contain an internal chamber that is in fluid communication with the crevasse so that insecticide can be injected into this internal chamber and then flow into this at least one crevasse.

5 Claims, 2 Drawing Sheets

INSECTICIDE PRESENTATION DEVICE

BACKGROUND OF THE INVENTION

1. Field of the Invention

When an exterminator enters a home or any other establishment, that exterminator must comply with EPA, OHSA, Department of Environmental Conservation and other rules or laws when dispensing insecticide within a home. To ease the requirement levels for the exterminator the present invention relates to an insecticide presentation device that is designed to help an exterminator comply with a series of stringent rules as described above. Essentially, the invention relates to an insecticide presentation device that contains a body, and a series of spikes or protrusions to elevate the body away from a surface.

2. Description of the Prior Art

The following references are known in the art. U.S. Pat. Nos. 5,987,809; 4,173,093; 5,531,043; 5,802,761; 2,435,317; 790,620; 600,530; 1,566,199; 2,547,314; 2,665,518; and 5,987,810; are known in the art. The present invention is an improvement over the designs of the references cited above because this present invention provides an insecticide presentation device that can be placed on or adjacent to a surface using an omni-directional device.

SUMMARY OF THE INVENTION

The present invention was designed to overcome the problems of the art by presenting an omnidirectional insecticide presentation device containing a series of protrusions or spikes extending out therefrom. The presentation device acts as a body containing a series of crevasses, or elongated indentations for receiving an insecticide. This device can receive an insecticide that is injected as a gel into these indentations. Once the gel is inserted into these indentations, the device can then be placed behind furniture, appliances, up into ceiling tiles, under cabinets or any other place that would be necessary to rid of insects.

The presentation device contains a series of protrusions in the form of ridges, spikes, or bumps that keep the indentations or crevasses away from a particular surface such as a wall, a floor, appliance or a ceiling tile. It is important to keep these indentations that have been injected away from these surfaces to allow insects access to the insecticides housed in these indentations.

The body of this device can be shaped such that it resembles a football, with an oval cross section, a pyramid, with a triangular cross section, a sphere with a circular cross-section, or block-shaped with a substantially rectangular cross section.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings wherein similar reference characters denote similar elements throughout the several views:

FIG. 3A shows a cross-sectional view of the device having an inner chamber; and

FIG. 3B shows a side view of the embodiment in FIG. 3A.

DETAILED DESCRIPTION OF THE PREFERRED EMBODIMENT

Figure 1A:
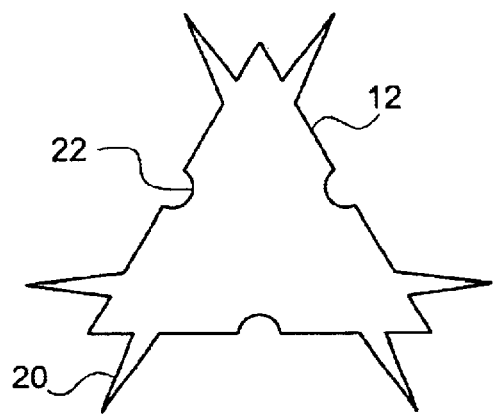
FIG. 1A is a cross-sectional view of a first embodiment of the invention.
Figure 1B:
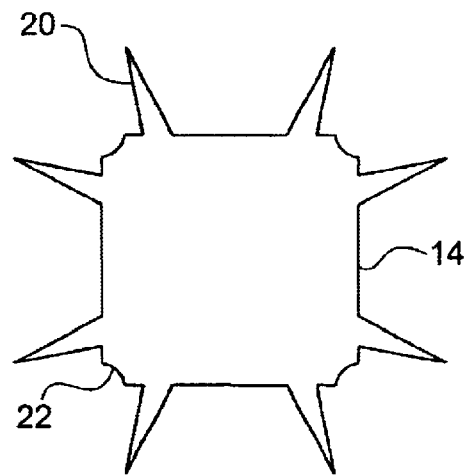
FIG. 1B is a cross-sectional view of a second embodiment of the invention.
Figure 1C:
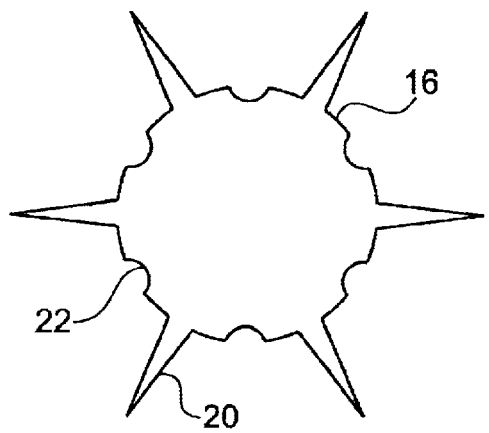
FIG. 1C is a cross sectional view of the third embodiment of the invention.
Figure 1D:
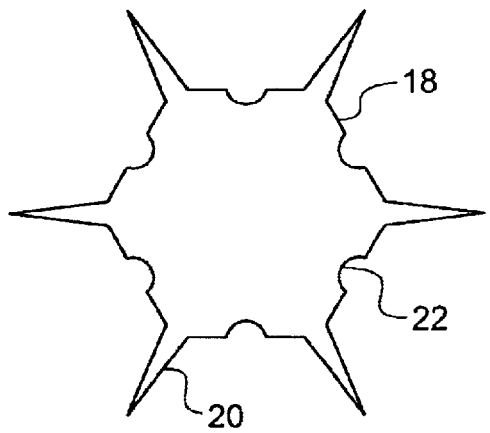
FIG. 1D is a cross sectional view of the fourth embodiment of the invention.
Figure 2A:
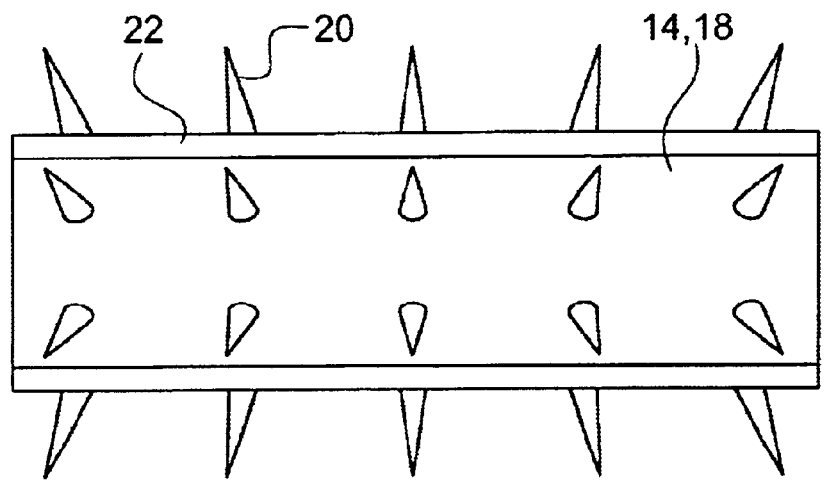
FIG. 2A is a side view of the first embodiment of the invention.
Figure 2B:
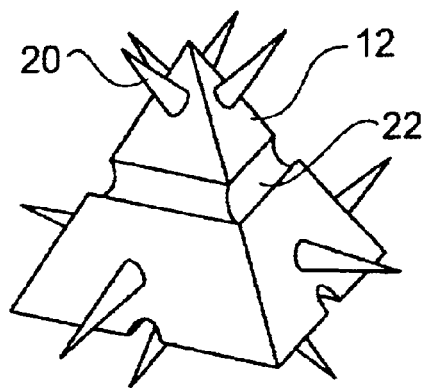
FIG. 2B is a front view of the first embodiment of the invention.
Figure 2C:
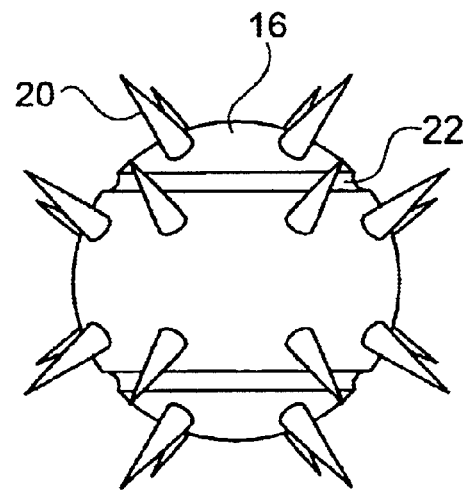
FIG. 2D is a side view of the fifth embodiment of the invention.
Figure 2D:
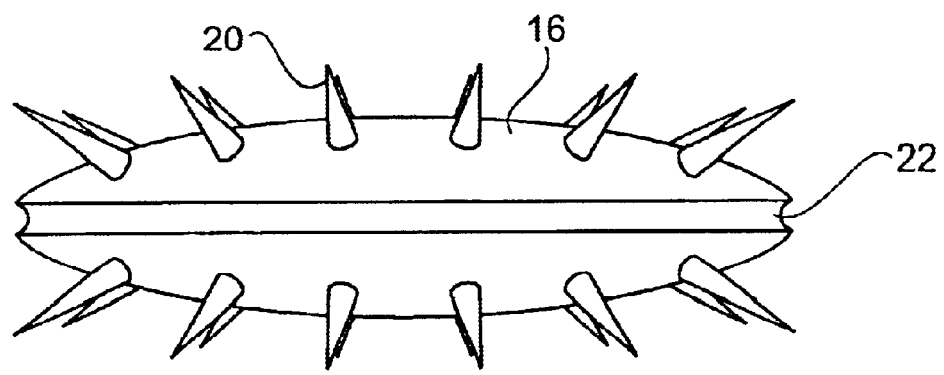

FIGS. 1A, 1B, 1C, and 1D show side cross-sectional views of the first four embodiments of the invention, FIG. 2A shows a side view of FIG. 1B. FIG. 2B shows a side view of FIG. 1A, FIG. 2C shows a side view of FIG. 1C while FIG. 2D shows a side view of FIG 1C. These different embodiments show some of the different possible shapes for the cross sections of these devices 10. For example the device can have a body 12 having a triangular cross section and shaped like a prism or a pyramid as shown in FIG. 2B.

FIG. 1B shows a second design of a body 14 which has a square or rectangular cross section and can be formed as an elongated member shown in FIG. 2A.

FIG. 1C shows a third design of a body 16 which has a circular cross section and can be shaped as a sphere 16' as shown in FIG. 2C or substantially similar to a football 16" as shown in FIG. 2D.

Finally, FIG. 1D shows a fourth design of a body 18 having a hexagonal cross section which can be formed as an elongated member shown in FIG. 2A.

All of the above embodiments contain a series of spikes or protrusions 20 extending out from this device such that they keep the body of this device away from a particular surface such as a wall, floor or ceiling tile. In addition all of these embodiments contain at least one channel 22 in which an insecticide can be injected therein. These channels extend along the length of the body and provide a region for housing this insecticide.

As with all of the shapes of these embodiments, the design is such that all of these embodiments can either be placed, or thrown blindly into an inaccessible area and then left to sit on one side so that the crevasses are elevated above a substantially horizontal surface such as a floor and also disposed away from a vertical surface such as a wall. This distance is sufficient to allow insects such as ants or cockroaches to gain access to the insecticide disposed within these crevasses.

The body, crevasses and the protrusions can be made in varying sizes so as to allow different kinds of insects access to the insecticide.

As shown in FIGS. 3A, and 3B the body can also contain an internal chamber 26 that allows an insecticide to be injected therein. This internal chamber is in fluid communication with the crevasses such that fluid such as a gel that is injected into the chamber then flows into these crevasses. The fluid essentially flows down this internal chamber and through a series of conduits 28 that allow the fluid to flow to the crevasses. The crevasses contain a series of holes 29 allowing fluid to flow out of these holes and into the crevasses.

This internal chamber is open at one end 30 and closed at the other end 32 so that the fluid does not flow out the other side. Instead, as fluid is injected into this internal chamber, pressure builds up within this chamber and is relieved when fluid flows through the conduits and out of the holes. Thus, with this design, a user only has to insert an injection nozzle into an opening 30 within internal chamber 26 and then inject the fluid to fill all of the crevasses 22 in a particular device up.

Accordingly, while several embodiments of the present invention have been shown and described, it is to be understood that many changes and modifications may be made thereunto without departing from the spirit and scope of the invention as defined in the appended claims.

What is claimed is:

1. A device for presenting insecticide comprising:
   a) a base having a surface with a plurality of substantially straight elongated channels each having a surface for receiving insecticide;
   b) a plurality of rows of protrusions each comprising at least two protrusions wherein said plurality of rows of protrusions include at least a first row of protrusions disposed on one side of at least one of said plurality of substantially straight elongated channels and at least a second row of protrusions disposed on an opposite side of said at least one of said plurality of substantially straight elongated channels; and
   c) an insecticide disposed on said at least one of said plurality of substantially straight elongated channels so that said insecticide is disposed on an exterior surface of said base and is freely exposed for interaction with said insects wherein said plurality of protrusions are used to keep said insecticide off of, and spaced away from a corresponding adjacent substantially horizontal or vertical surface.

2. A device for presenting insecticide comprising:
   a) a base having a surface with a plurality of substantially straight elongated indentations each having a surface for receiving insecticide;
   b) a plurality of spacing elements in the form of a plurality of rows of protrusions each comprising at least two protrusions, wherein at least one of said plurality of substantially straight elongated indentations extends along said base between at least two of said plurality of rows of protrusions, so that when the device is placed in use at least two of said plurality of rows of protrusions extend out from said surface on said base in a substantially vertical manner, in a substantially opposite direction from each other, and at least two other rows of protrusions extend out from said surface on said base in a substantially horizontal manner, in a substantially opposite direction from each other;
   c) an insecticide disposed on at least one of said plurality of substantially straight elongated indentations so that said insecticide is disposed on an exterior surface of said base and is freely exposed for interaction with said insects wherein said plurality of spacing elements are used to keep said insecticide off of, and spaced away from a corresponding adjacent substantially horizontal or vertical surface.

3. A process for presenting insecticide comprising:
   a) presenting a device having a base having a plurality of substantially straight elongated channels each having a surface on an exterior surface of said base, said device having a plurality of rows of protrusions each comprising at least two protrusions extending out from said base wherein at least one of said plurality of substantially straight elongated channels extends along said base between at least two of said plurality of rows of protrusions, said plurality of substantially straight elongated channels for receiving and presenting insecticide;
   b) inserting said insecticide into said at least one of said plurality of substantially straight elongated channels so that said insecticide rests in said at least one channel and is exposed; and
   c) depositing said device on a surface wherein said plurality of rows of protrusions include at least two rows of protrusions that extend out in a substantially vertical manner and at least two other rows of protrusions that extend out in a substantially horizontal manner and are used to keep said plurality of substantially straight elongated channels spaced a sufficient distance apart from an adjacent surface so that insects can access the insecticide.

4. The process as claimed in claim 3, wherein said insecticide is in the form of a gel substance and is injected along said at least one channel.

5. A process for presenting insecticide comprising the steps of:
   a) presenting a device having a base having a plurality of substantially straight elongated indentations, said device having a plurality of rows of protrusions each comprising at least two protrusions extending out from said base wherein at least one of said substantially straight elongated indentations extends between at least two of said plurality of rows of protrusions;
   b) injecting an insecticide into said at least one of said plurality of said substantially straight elongated indentations so that said insecticide is disposed on an exterior surface of said base and is freely exposed for interaction with said insects; and
   c) depositing said device on a surface wherein said plurality of rows of protrusions include at least two rows of protrusions that extend in a substantially vertical manner in a substantially opposite direction from each other and at least two other rows of protrusions that extend in a substantially horizontal manner in a substantially opposite direction from each other and are used to keep said plurality of substantially straight elongated indentations spaced a sufficient distance apart from an adjacent surface so that insects can access the insecticide in said plurality of substantially straight elongated indentations.

* * * * *